US012073699B2

(12) United States Patent
Yong et al.

(10) Patent No.: US 12,073,699 B2
(45) Date of Patent: Aug. 27, 2024

(54) SECURITY ECOSYSTEM

(71) Applicant: MOTOROLA SOLUTIONS, INC., Chicago, IL (US)

(72) Inventors: Jia Wen Yong, Bayan Lepas (MY); Tze Voon Tan, Bukit Mertajam (MY); Woei Chyuan Tan, Bayan Lepas (MY); Choon Kang Wong, Ipoh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/658,262

(22) Filed: Apr. 7, 2022

(65) Prior Publication Data

US 2023/0326310 A1 Oct. 12, 2023

(51) Int. Cl.
*G08B 13/196* (2006.01)

(52) U.S. Cl.
CPC . *G08B 13/19615* (2013.01); *G08B 13/19645* (2013.01); *G08B 13/19656* (2013.01); *G08B 13/19682* (2013.01)

(58) Field of Classification Search
CPC ........ G08B 13/19645; G08B 13/19615; G08B 13/19656; G08B 13/19682
See application file for complete search history.

(56) References Cited

U.S. PATENT DOCUMENTS 7,840,515 B2 * 11/2010 Ozdemir ................ G08B 31/00 706/47
9,520,040 B2 12/2016 Mavromatis
11,030,442 B1 * 6/2021 Bergamo .............. G06F 18/214
11,284,041 B1 * 3/2022 Bergamo ................ G06T 7/251
2011/0320240 A1 * 12/2011 Flores ................ G06Q 10/0639 382/218
2013/0147961 A1 * 6/2013 Gao ........................ H04N 7/181 348/159
2022/0201202 A1 * 6/2022 Venetianer .......... G06F 18/2431

OTHER PUBLICATIONS

Orchestrate User Guide, Motorola Solutions, Inc.—MN007834A01-B, Mar. 2021, all pages.
Orchestrate System Planner, Motorola Solutions, Inc.—MN007836A01-B, Mar. 2021, all pages.
Venetianer, Peter L, et al.: "Device, Method and System For Installing Video Analytics Parameters at a Video Analytics Engine", U.S. Appl. No. 17/125,442, filed Dec. 17, 2020, all pages.

* cited by examiner

*Primary Examiner* — Rowina J Cattungal

(57) ABSTRACT

A system, method, and apparatus for implementing workflows across multiple differing systems and devices is provided herein. During operation a workflow for a first camera is automatically suggested, or a new workflow generated for the first camera, based upon a workflow being created for a second camera having a similar field of view as the first camera. In particular, a workstation (or server) will receive an indication that a workflow was created for a camera. The workstation (or server) then determines if any other cameras have similar field of views. New workflows will then be suggested (or implemented) for the cameras having similar field of views. The suggested/implemented workflows will have a similar trigger and a similar action.

10 Claims, 10 Drawing Sheets

SECURITY ECOSYSTEM

BACKGROUND OF THE INVENTION

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures. It would also be beneficial if such a tool automates the creation of new (or suggested) workflows to reduce an amount of work needed for an operator to create such workflows.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
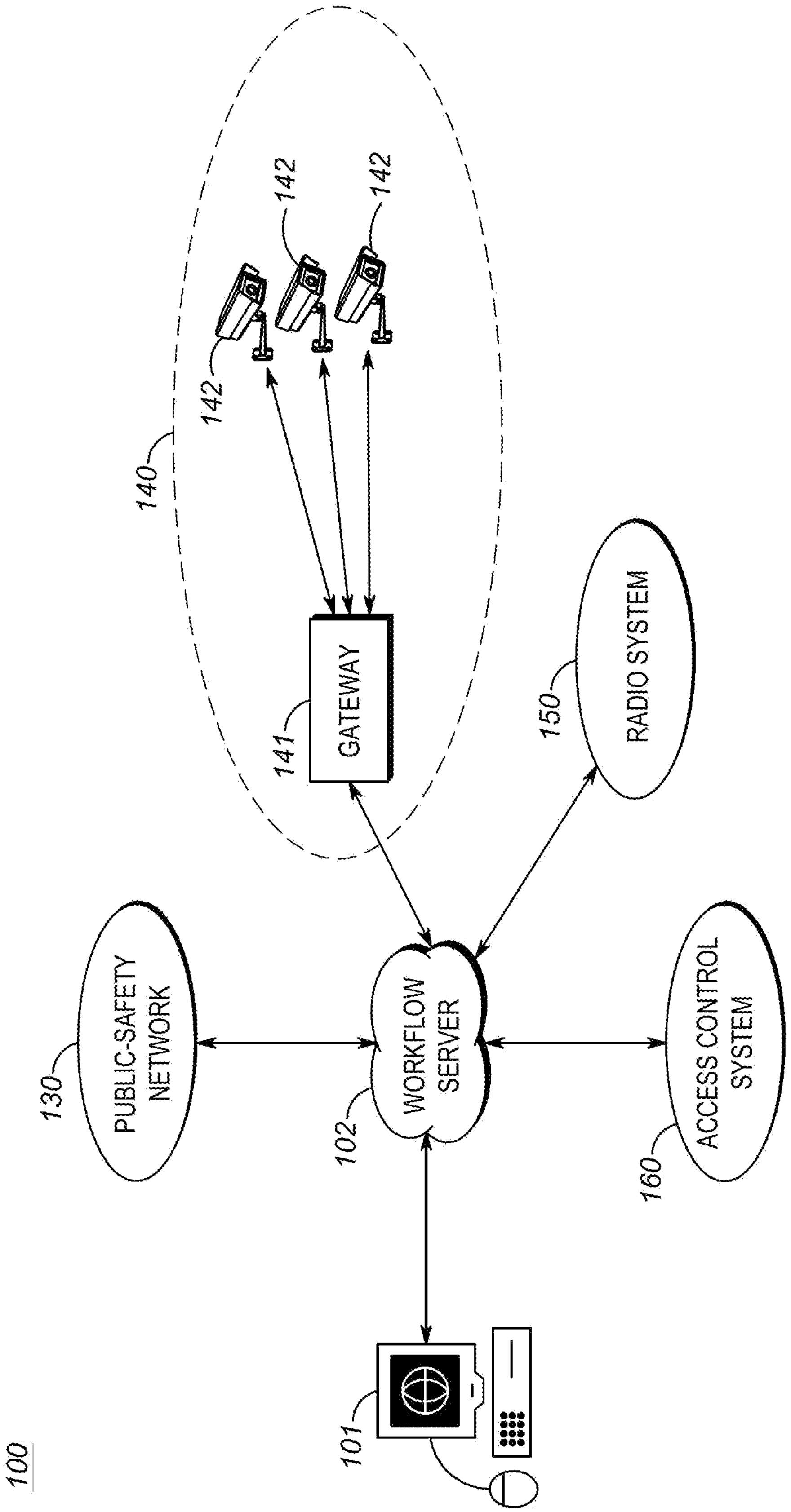
FIG. 1 illustrates a security ecosystem capable of configuring and automating workflows.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. During operation a workflow for a first camera is automatically suggested, or a new workflow generated for the first camera, based upon a workflow being created for a second camera having a similar field of view as the first camera. In particular, a workstation (or server) will receive an indication that a workflow was created for a camera. The workstation (or server) then determines if any other cameras have similar field of views. New workflows will then be suggested (or implemented) for the cameras having similar field of views. The suggested/implemented workflows will have a similar trigger and a similar action.

In an alternate embodiment, minor changes to the action may be made for the new workflows based on an entity responsible for a geographic area of the camera utilized in the new workflow.

Consider the following example: A 30-story hotel performs an upgrade to all cameras monitoring hallways of the hotel (e.g., a new software update). Assume that the updated cameras comprise new features that are to be utilized in creation of workflows for each camera. In the past, an operator would need to create at least 30 separate workflows (one for each camera on each floor) to have similar workflows made for each camera. Instead, when the operator creates the first workflow for a camera, the workstation or server will determine a field of view for the camera, and find similar field of views for other cameras. Similar workflows will be created or suggested for all cameras having similar field of view. So, for example, if all 30 cameras have a similar field of view (e.g., looking down a hallway from a position near an elevator), 29 suggested workflows (one for each camera with a similar field of view) will be suggested/implemented.

As mentioned above, in an alternate embodiment of the present invention, the workflow may be modified slightly based on where the cameras are located. For example, if a workflow has an action of "notify security team A", however, security team B is in charge of the $30^{th}$ floor, the workflow for the camera on the $30^{th}$ floor will be modified to have an action of "notify security team B".

Turning now to the drawings, wherein like numerals designate like components, FIG. 1 illustrates security ecosystem 100 capable of creating workflows across multiple systems. As shown, security ecosystem 100 comprises public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1, one of ordinary skill in the art will recognize that more or fewer networks and systems may be included in ecosystem 100.

Workstation 101 is preferably a computer configured to execute Motorola Solutions' Orchestrate™ and Ally™ dispatch and incident management software. As will be discussed in more detail below, workstation 101 is configured to present a user with a plurality of triggers capable of being detected by systems 130-160 as well as present the user with a plurality of actions capable of being executed by systems 130-160. The user will be able to create workflows and upload these workflows to workflow server 102 based on the presented triggers and actions.

Workflow server 102 is preferably a server running Motorola Solutions' Command Central™ software suite comprising the Orchestrate™ platform. Workflow server 102 is configured to receive workflows created by workstation 101 and implement the workflows. Particularly, the workflows are implemented by analyzing events detected by systems 130-160 and executing appropriate triggers. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Video surveillance system 140 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/video analysis engine (VAE) that comprises a software engine that analyzes any video captured by the cameras. Using the VAE, the video surveillance system 140 is capable of "watching" video or a live feed to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solutions' Access Control Management (ACM)™ software suite.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOTRBO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. Access control system 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capabilities to detect triggers across a number of devices within network and systems 130-160 quickly take actions by automatically executing the proper procedure (i.e., executing the appropriate action once a trigger is detected).

As shown, video surveillance system 140 comprises a plurality of cameras 142 and gateway 141. Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine is configured to "watch" video and detect pre-selected objects such as license plates, people, faces, automobiles. The software engine may also be configured to detect certain actions of individuals, such as fighting, loitering, crimes being committed, . . . , etc. The VAE may contain any of several object/action detectors. Each object/action detector "watches" the video (which may include a live feed) for a particular type of object or action. Object and action detectors can be mixed and matched depending upon what is trying to be detected. For example, an automobile object detector VAE may be utilized to detect automobiles, while a fire detector VAE may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 2:
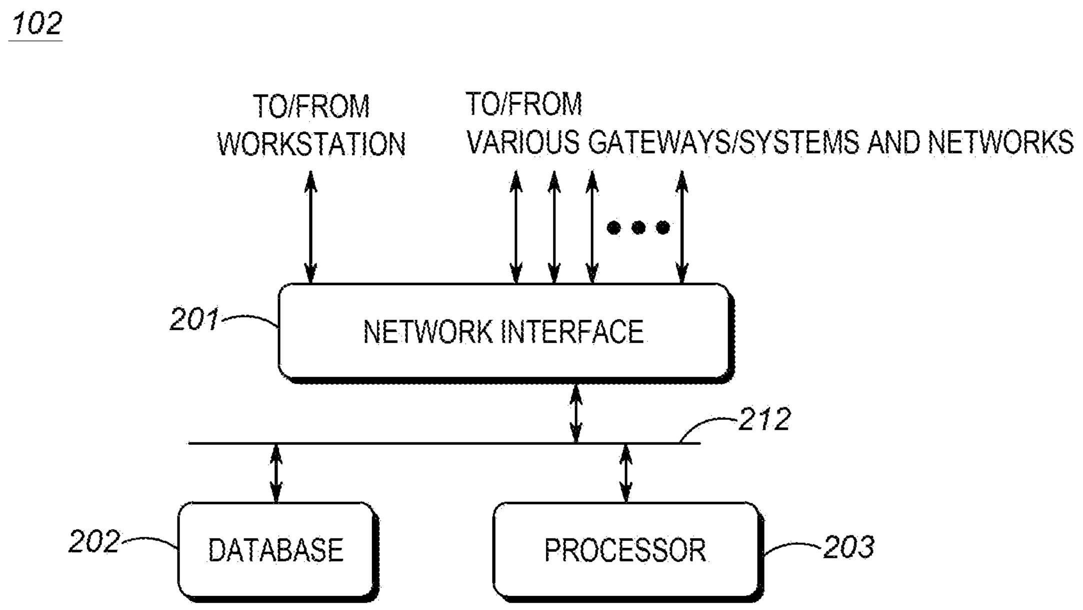
FIG. 2 is a block diagram of a workflow server of FIG. 1.

FIG. 2 is a block diagram of a workflow server of FIG. 1. As shown, workflow server 102 comprises network interface 201, database 202, bus 212, and processor (serving as logic circuitry) 203. Workflow server 102 may include various components connected by a bus 212. Workflow server 102 may include a hardware processor (logic circuitry) 203 such as one or more central processing units (CPUs) or other processing circuitry able to provide any of the functionality described herein when running instructions. Processor 203 may be connected to a memory 202 that may include a non-transitory machine-readable medium on which is stored one or more sets of instructions. Memory 202 may include one or more of static or dynamic storage, or removable or non-removable storage, for example. A machine-readable medium may include any medium that is capable of storing, encoding, or carrying instructions for execution by processor 203, such as solid-state memories, magnetic media, and optical media. Machine-readable medium may include, for example, Electrically Programmable Read-Only Memory (EPROM), Random Access Memory (RAM), or flash memory.

The instructions may enable workflow server 102 to operate in any manner thus programmed, such as the functionality described specifically herein, when processor 203 executes the instructions. The machine-readable medium may be stored as a single medium or in multiple media, in a centralized or distributed manner. In some embodiments, instructions may further be transmitted or received over a communications network via a network interface 210 utilizing any one of a number of transfer protocols (e.g., frame relay, internet protocol (IP), transmission control protocol (TCP), user datagram protocol (UDP), hypertext transfer protocol (HTTP), etc.).

Logic circuitry 203 is configured to execute (or cause to be executed) a particular action associated with the trigger. More particularly, when logic circuitry 203 receives an indication that a trigger was detected from any attached network or system, logic circuitry will access database 202 to determine an action (if any) for the particular trigger. If an action has been determined that is associated with the trigger, logic circuitry 203 will execute the action, or cause the action to be executed. In order to perform the above, logic circuitry executes an instruction set/software (e.g., Motorola Solutions' Command Central™ software suite comprising the Orchestrate™ platform) stored in database 202.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Database 202 comprises standard memory (such as RAM, ROM, . . . , etc) and serves to store associations between triggers and actions. This is illustrated in Table 1, below.

TABLE 1

Associations Between Triggers and Actions.

| Trigger | Action |
|---|---|
| Warehouse back door opened | Pan camera 342 to point at door |
| Man-Down sensor activated for Officer Smith | Notify dispatch center via emergency text message |
| ALPR for delivery truck | Open back gate |
| . . . etc. | . . . etc. |

Figure 3:
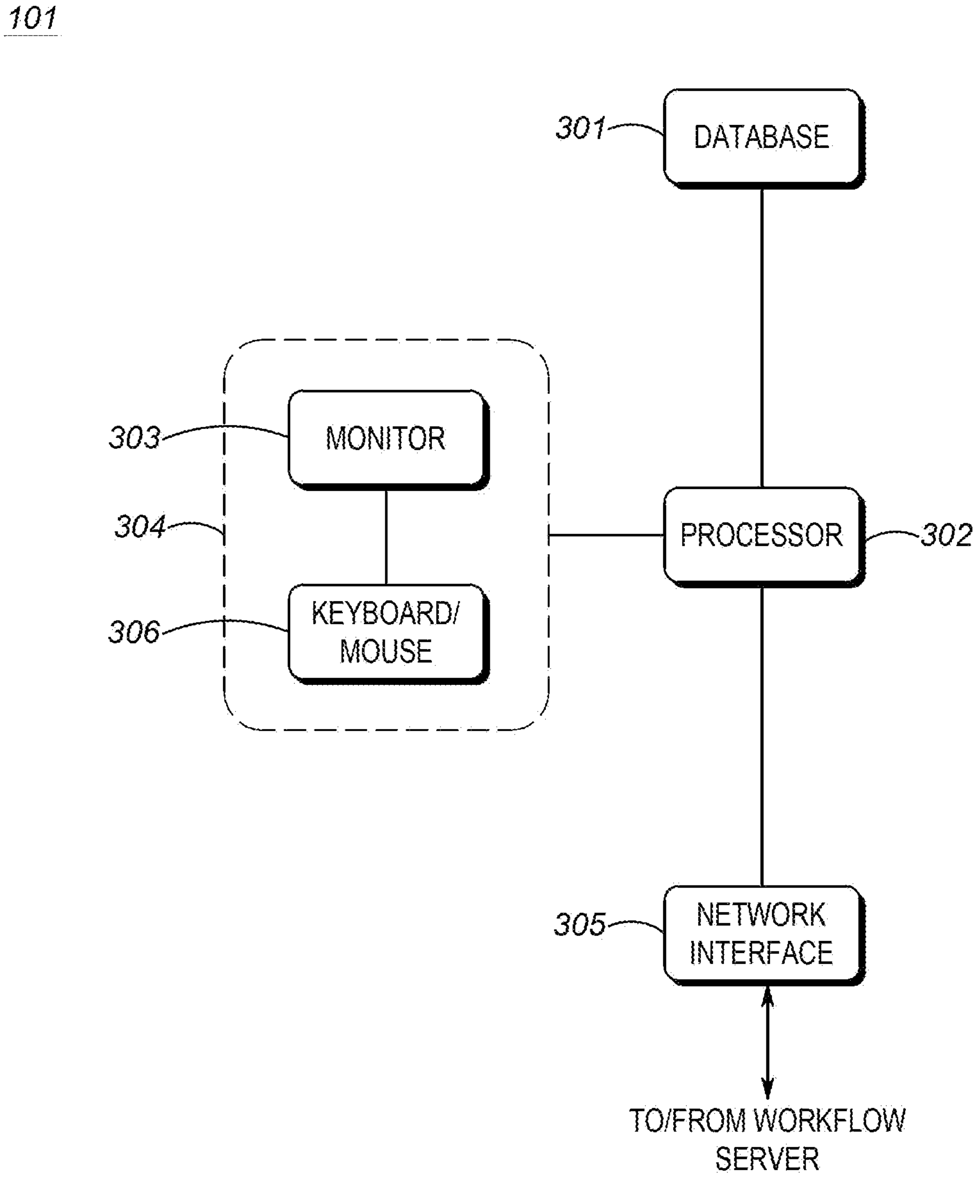
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical-user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Workstation 101 includes processor (logic circuitry) 302, such as one or more central processing units (CPUs) or other processing circuitry able to provide any of the functionality described herein when running instructions. Processor 302 may be connected to a memory 301 that may include a non-transitory machine-readable medium on which is stored one or more sets of instructions. Memory 301 may include one or more of static or dynamic storage, or removable or non-removable storage, for example. A machine-readable medium may include any medium that is capable of storing, encoding, or carrying instructions for execution by processor 302, such as solid-state memories, magnetic media, and optical media. Machine-readable medium may include, for example, Electrically Programmable Read-Only Memory (EPROM), Random Access Memory (RAM), or flash memory.

The instructions may enable workstation 101 to operate in any manner thus programmed, such as the functionality described specifically herein, when processor 302 executes the instructions. The machine-readable medium may be stored as a single medium or in multiple media, in a centralized or distributed manner. In some embodiments, instructions may further be transmitted or received over a communications network via a network interface 305 utilizing any one of a number of transfer protocols (e.g., frame relay, internet protocol (IP), transmission control protocol (TCP), user datagram protocol (UDP), hypertext transfer protocol (HTTP), etc.).

Logic circuitry 302 is configured to execute Motorola Solutions' Orchestrate™ and Ally™ dispatch and incident management software from storage 305. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprise any combination of monitor 303 (e.g., touch screen, a computer screen, . . . , etc.) and keyboard/mouse combination 306.

Figure 4:
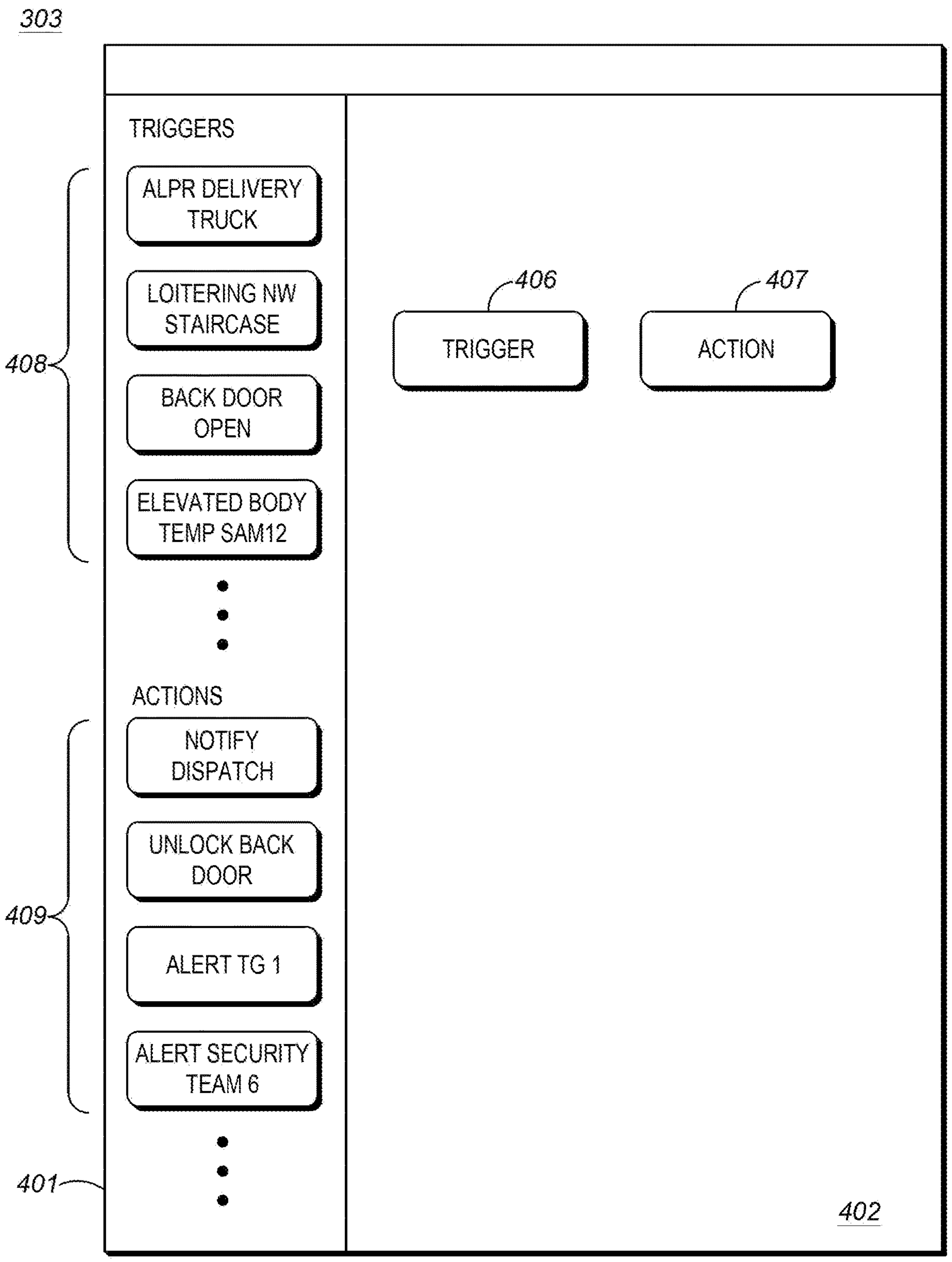
FIG. 4 illustrates the creation of a workflow.

FIG. 4 illustrates the creation of a workflow. More particularly, FIG. 4 illustrates a dashboard displayed on monitor 303 utilized for the creation of workflows. The dashboard consists of the following main elements:

- selection pane 401 on the left-hand side, which comprises the available triggers 408 and actions 409;
- workspace 402, which comprises the large area in the middle of the dashboard used to create workflows that define the connections between triggers and actions. Each trigger and action in the workspace is displayed as a separate field 406 and 407 with an outline and a title. As shown in FIG. 4, two fields 406 and 407 are shown, one labeled "trigger" and another labeled "action".

Triggers 408 represent the detected events originating from various sensors, software, and devices within security ecosystem 100. Actions 409 represent the possible responses to the triggers. A workflow comprises at least one trigger and at least one action.

After a workflow is deployed (i.e., uploaded to workflow server 102), its actions activate when the triggers occur (are detected). Triggers and actions appear on the workspace after they are dragged and dropped from the triggers 408 and actions 409 areas respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. As administrators add additional technology pieces to security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they are connected. To connect the trigger and actions, a user will click the end of one of the node, and drag a line to the other node.

Figure 5:
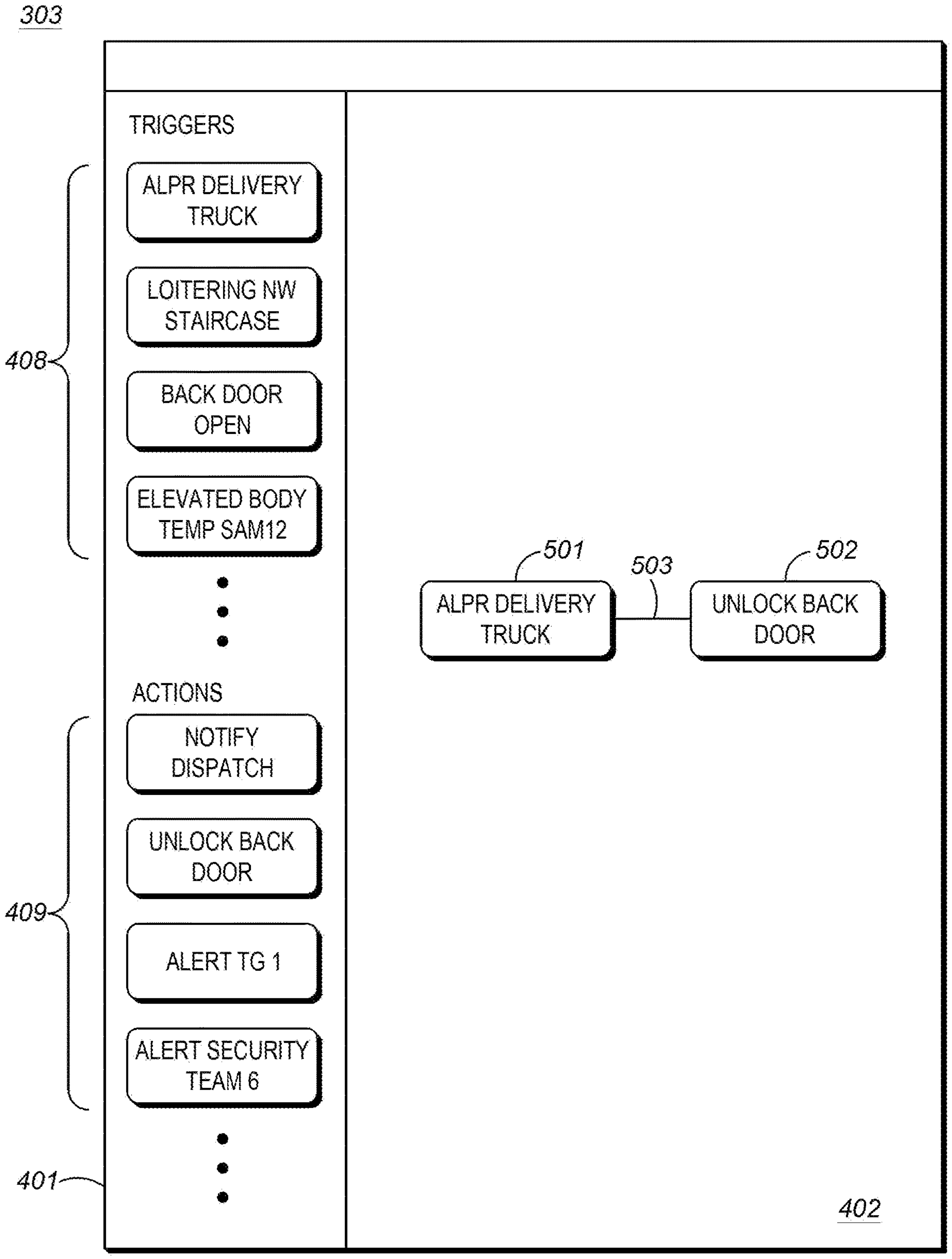
FIG. 5 illustrates the creation of a workflow.

As shown in FIG. 5, a trigger "ALPR delivery truck" 501 has been associated with an action "unlock back door" 502 by dragging line 503 between the two. If any of the triggers occurs (are detected), the action(s) is executed. Sometimes this is referred to as the "workflow being executed".

Figure 6:
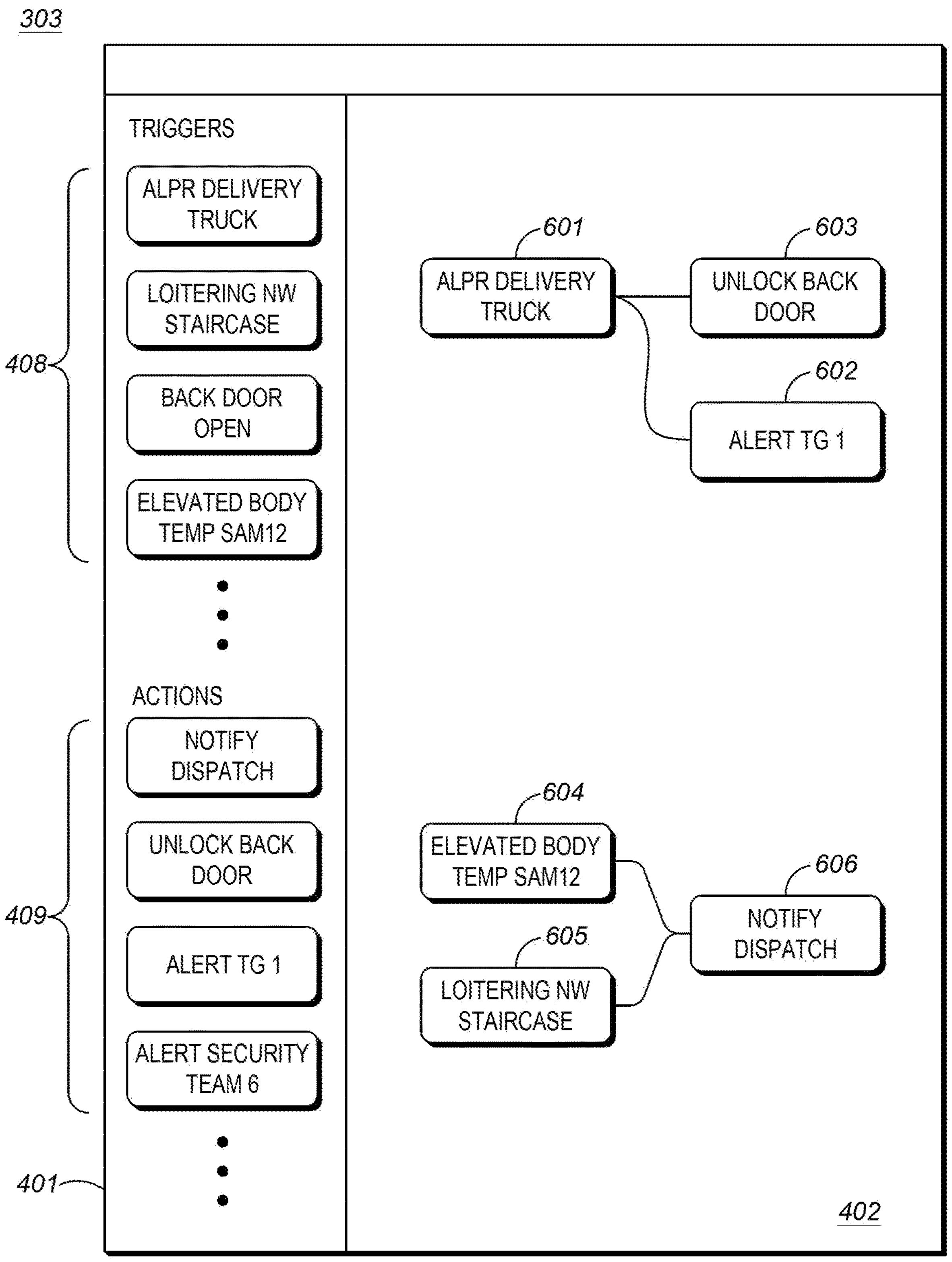
FIG. 6 illustrates the creation of a workflow.

As illustrated in FIG. 6, a workflow may comprise a single trigger that is associated with multiple actions. Thus, the trigger "ALPR delivery truck" 601 may be associated with action "unlock back door" 603 as well as associated with "alert TG 1" 602. When this workflow is uploaded to workflow server 102, the automatic license plate detected for the delivery truck will cause both the back door to unlock and an alert to be sent on talkgroup #1.

In a similar manner a workflow may comprise multiple triggers associated with a single action. Thus, both the triggers "elevated body tem SAM 12" 604 or "loitering NW staircase" will cause the action of "notify dispatch" 606. Thus, when officer SAM 12 has an elevated body temperature dispatch is notified, and when loitering is detected in the NW staircase, dispatch is notified.

As mentioned above, users can create and implement a workflow by associating a trigger with a particular action, or multiple triggers with an action. Once one of the triggers is detected, the associated action is executed. A workflow being "executed" is considered at least one trigger triggering an action.

Figure 7:
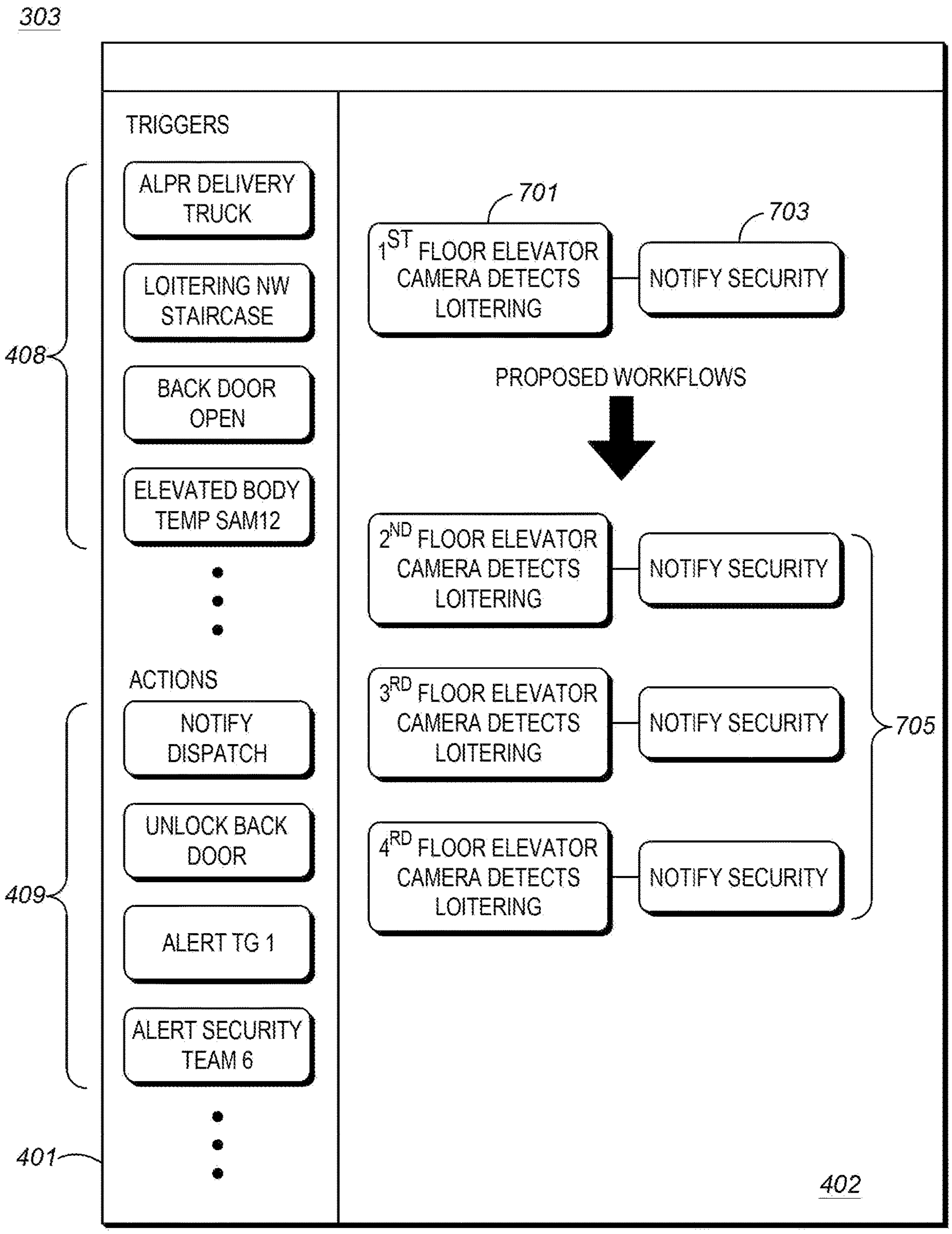
FIG. 7 illustrates a new workflow presented to a user.

As discussed above, a user may have many workflows to create for multiple cameras 142. For example, consider FIG. 7 where a user may select a trigger for a workflow as "1$^{st}$ floor elevator camera detects loitering", and an action "notify security". When this happens, logic circuitry 203, or logic circuitry 302 may analyze a current field of view for the 1st floor elevator camera by accessing the camera within surveillance system 140. All other cameras within system 140 will then be accessed to determine their current field of view. The other cameras field of views will be compared to the 1$^{st}$ floor elevator camera, and those with similar fields of view will have similar workflows suggested. More particularly, a similar action and a similar trigger to the created workflow will be proposed for all other cameras having a similar field of view. This is illustrated in FIG. 7 where proposed workflows 705 are suggested for the 2$^{nd}$ floor elevator camera, the 3$^{rd}$ floor elevator camera, and the 4$^{th}$ floor elevator camera. As shown in FIG. 7, a similar trigger for the other cameras is proposed with the same action.

Figure 8:
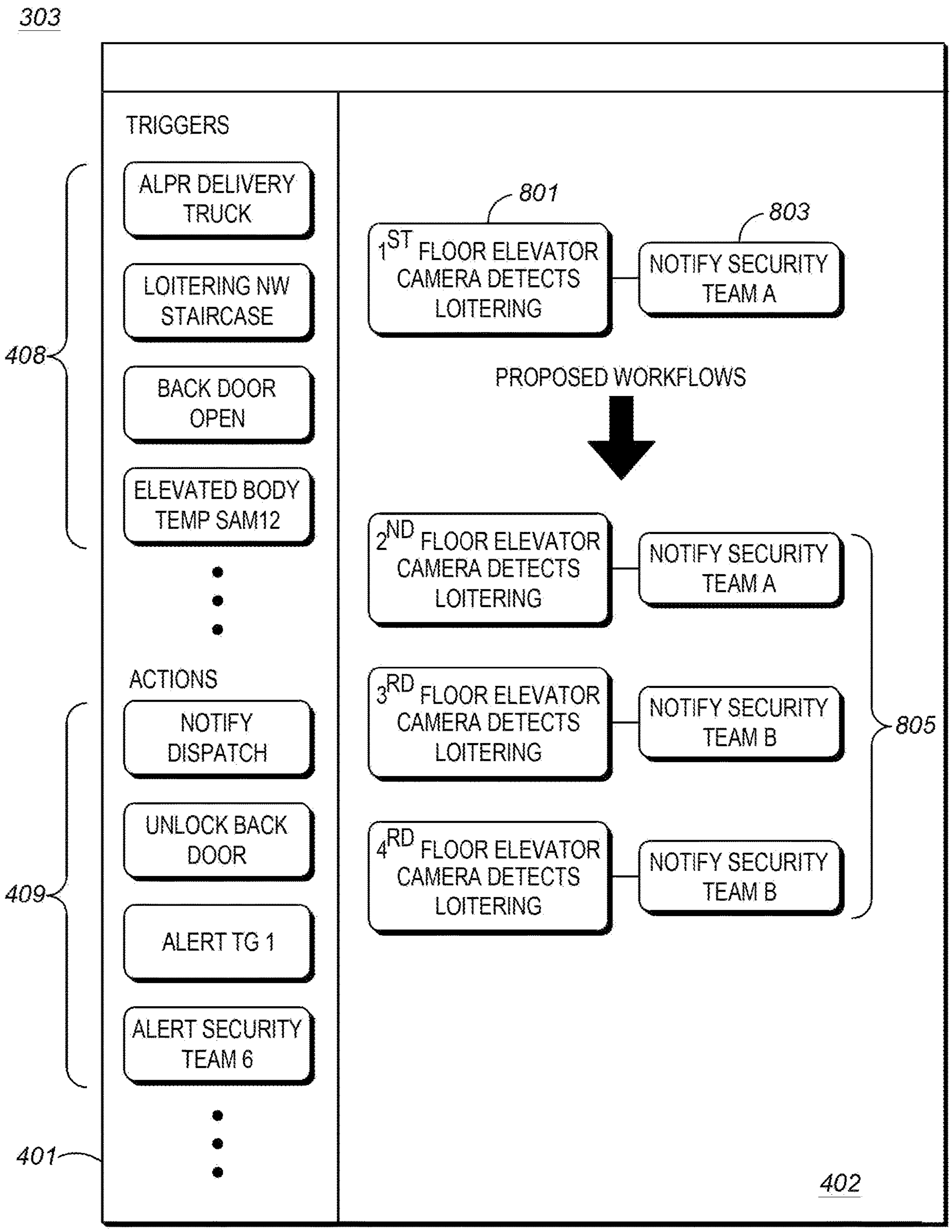
FIG. 8 illustrates a new workflow presented to a user.

In an alternate embodiment of the present invention, a database (i.e., database 202 or database 301) may be accessed in order to determine assignments for each camera for a particular action. Alternate actions may then be proposed that are similar to the action of the created workflow, however, having a different entity assigned to the action. This is illustrated in FIG. 8, where security team A is responsible for the 1$^{st}$ and 2$^{nd}$ floor cameras, while security team B is responsible for the 3$^{rd}$ and the 4$^{th}$ floor elevator cameras. Thus, FIG. 8 illustrates proposed triggers 805 having different security teams being notified, depending upon what floor detects loitering.

With FIG. 8 in mind, databases 202 and 301 may comprise a table of assignments for each camera for a particular action. This is illustrated in Table 2.

TABLE 2

Various responsibilities for various cameras.

| Device | Assignment for security | Assigned Talkgroup | . . . | Assigned for Cleaning |
|---|---|---|---|---|
| 1$^{st}$ floor camera | Team A | TG 123 | | Team 22 |
| 2$^{nd}$ floor camera | Team A | TG 123 | | Team 36 |
| 3$^{rd}$ floor camera | Team B | TG 434 | | Team 40 |
| 4$^{th}$ floor camera | Team B | TG 434 | | Team 50 |

It should be noted that logic circuitry may identify two camera's field of view as similar by taking an image from each camera and comparing the two images. The images may be converted to black and white, scaled to a particular size/zoom, and then compared. Two cameras are determined to have a similar field of view if a predetermined percentage of their field of views are similar (e.g., 70%).

With the above in mind, workstation 101 comprise database 301 comprising triggers and their associated actions, a graphical user interface 304 configured to receive workflows created by an operator, and logic circuitry 302 configured to receive a workflow from the operator, the workflow comprising a first trigger for a first camera and a first action, wherein the first trigger comprises an event detected by the first camera, and the first action comprises a response to the event being detected by the first camera, determine a first field of view for the first camera, determine a plurality of field of views for a plurality of other cameras, determine a subset of the plurality of other cameras with a similar field of view as the first field of view, and propose workflows via the graphical user interface, the proposed workflows being only for the subset with the similar field of view, wherein each proposed workflow has a trigger for a particular camera that is similar to the first trigger and an action similar the first action.

As discussed above, each proposed workflow has may have a trigger similar to the first trigger and the first action. Additionally, if the database further comprises a table comprising assignments for each camera for a particular action, the action similar to the first action comprises a response that is assigned based on the table.

Finally, network interface 305 is provided, and configured to receive an indication that a trigger was detected by the first camera.

Figure 9:
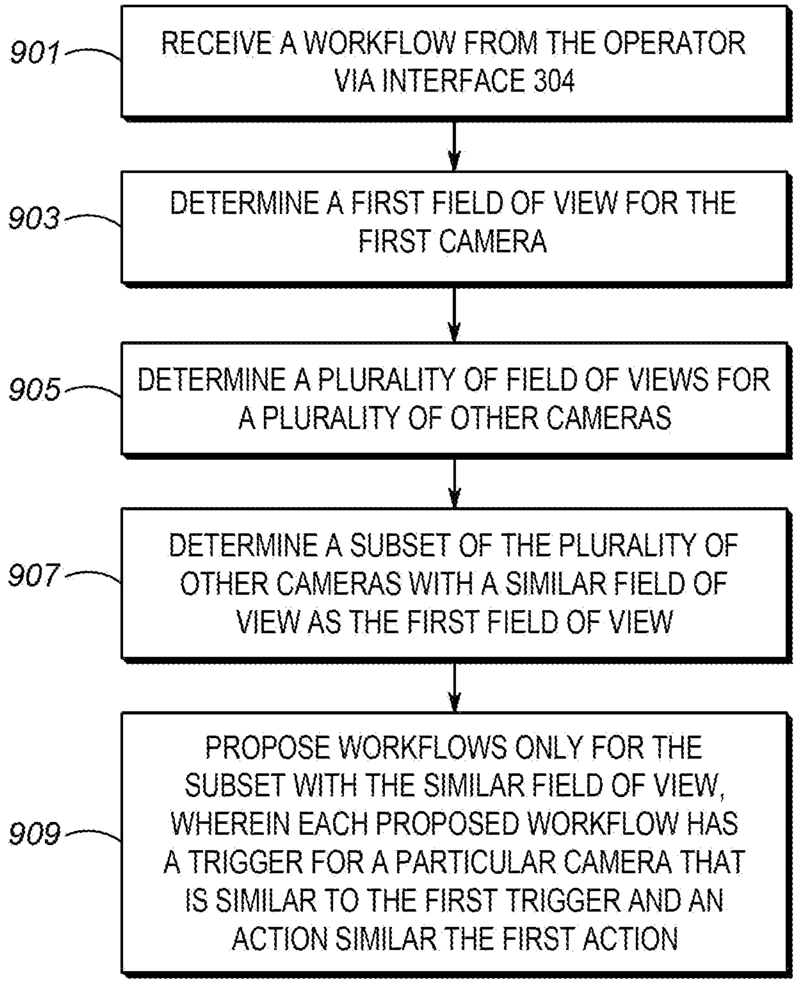
FIG. 9 is a flow chart showing operation of the workstation of FIG. 1.

FIG. 9 is a flow chart showing operation of workstation 101 of FIG. 1. The logic flow begins at step 901 where processor 302 receives a workflow from the operator via interface 304. As discussed, the workflow comprises a first trigger for a first camera and a first action, wherein the first trigger comprises an event detected by the first camera, and the first action comprises a response to the event being detected by the first camera. Processor 302 then determines a first field of view for the first camera (step 903) and determines a plurality of field of views for a plurality of other cameras (step 905). At step 907, processor 302 determines a subset of the plurality of other cameras with a similar field of view as the first field of view and at step 909 proposes workflows only for the subset with the similar field of view, wherein each proposed workflow has a trigger for a particular camera that is similar to the first trigger and an action similar the first action.

As discussed above, each proposed workflow may have the trigger similar to the first trigger and the first action, or alternatively, a table comprising assignments for each camera for a particular action may be accessed and the action similar to the first action may comprise a response that is assigned based on the table.

Figure 10:
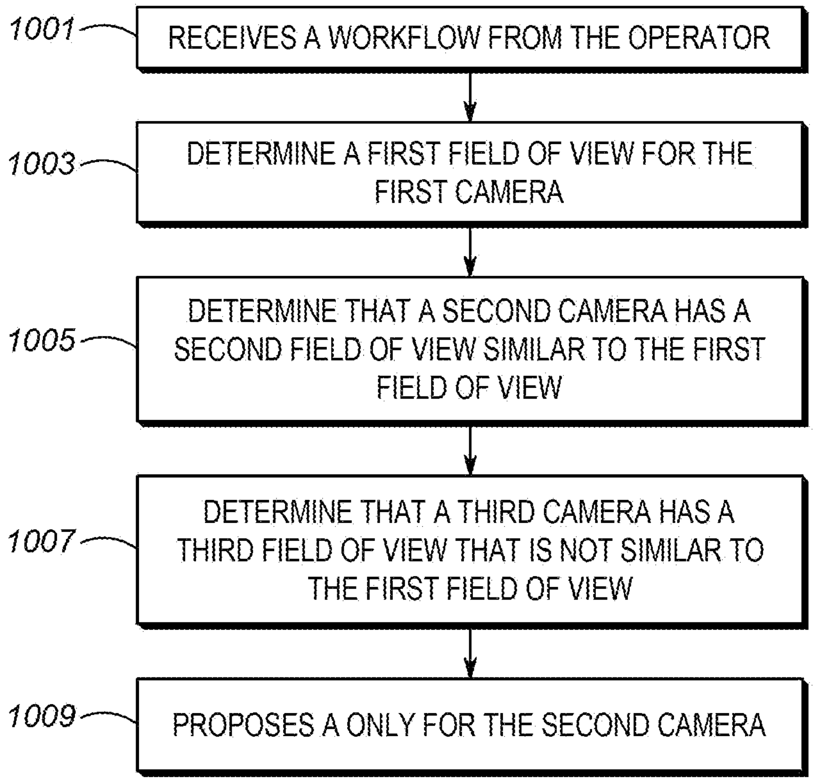
FIG. 10 is a flow chart showing operation of the workstation of FIG. 1.

FIG. 10 is a flow chart showing operation of workstation 101. The logic flow begins at step 1001 where processor 302 receives a workflow from the operator via interface 304. As discussed, the workflow comprises a first trigger for a first camera and a first action, wherein the first trigger for the first camera comprises an event detected by the first camera, and an action comprises a response to the event being detected by the first camera. At step 1003, processor 302 determines a first field of view for the first camera. At step 1005, processor 302 then determines that a second camera has a second field of view similar to the first field of view. At step 1007, processor 302 then determines that a third camera has a third field of view that is not similar to the first field of view. Finally, at step 1009, processor 302 proposes a workflow via interface 304. The workflow being proposed is only for the second camera with the second field of view similar to the first field of view, wherein the proposed workflow has a trigger for the second camera that is similar to the first trigger and an action similar the first action.

In the foregoing specification, specific embodiments have been described. However, one of ordinary skill in the art appreciates that various modifications and changes can be made without departing from the scope of the invention as set fore6rth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:

a database comprising triggers and their associated actions;

a graphical user interface configured to receive workflows created by an operator;

logic circuitry configured to:

receive a first workflow from the operator, the first workflow comprising a first trigger for a first camera and a first action, wherein the first trigger comprises an event detected by the first camera, and the first action comprises a response to the event being detected by the first camera; and responsively:

determine a first field of view for the first camera;

determine a plurality of field of views for a plurality of other cameras;

determine a subset of the plurality of other cameras with a similar field of view as the first field of view, wherein the other cameras have a similar field of view if a predetermined percentage of the other cameras' field of view and the first field of view are similar; and propose, based on the subset and via the graphical user interface, one or more second workflows that are different from the first workflow, the one or more second workflows being only for the subset with the similar field of view, wherein each proposed second workflow has a trigger for a particular camera that is similar to the first trigger and an action similar to the first action, and wherein the action comprises a response triggered by the trigger.

2. The apparatus of claim 1 wherein each second proposed workflow has the trigger similar to the first trigger and the first action such that the logic circuitry is configured to execute the action based on detection of the trigger.

3. The apparatus of claim 1 wherein:

the database further comprises a table comprising assignments for each camera for a particular action; and wherein the action similar to the first action comprises a response that is assigned based on the table.

4. The apparatus of claim 1 further comprising:

a network interface configured to receive an indication that a trigger was detected by the first camera.

5. A method for proposing a workflow to an operator, the method comprising the steps of:

receiving a first workflow from the operator, the first workflow comprising a first trigger for a first camera and a first action, wherein the first trigger comprises an event detected by the first camera, and the first action comprises a response to the event being detected by the first camera; and responsively:

determining a first field of view for the first camera;

determining a plurality of field of views for a plurality of other cameras;

determining a subset of the plurality of other cameras with a similar field of view as the first field of view, wherein the other cameras have a similar field of view if a predetermined percentage of the other cameras' field of view and the first field of view are similar; and proposing, based on the subset, one or more second workflows that are different from the first workflow, the one or more second workflows being only for the subset with the similar field of view, wherein each proposed second workflow has a trigger for a particular camera that is similar to the first trigger and an action similar to the first action, and wherein the action comprises a response triggered by the trigger.

6. The method of claim 5 wherein each proposed second workflow has the trigger similar to the first trigger and the first action for execution of the action based on detection of the trigger.

7. The method of claim 5 further comprising the step of:

accessing a table comprising assignments for each camera for a particular action; and wherein the action similar to the first action comprises a response that is assigned based on the table.

8. A method for suggesting a workflow to an operator, the method comprising the steps of:

receiving a first workflow from the operator, the first workflow comprising a first trigger for a first camera and a first action, wherein the first trigger for the first camera comprises an event detected by the first camera, and an action comprises a response to the event being detected by the first camera; and responsively:

determining a first field of view for the first camera;

determining that a second camera has a second field of view similar to the first field of view, wherein the second field of view is similar to the first field of view if a predetermined percentage of the second field of view and the first field of view are similar;

determining that a third camera has a third field of view that is not similar to the first field of view;

proposing, based on the second field of view, one or more second workflows that are different from the first work flow, the one or more second workflows being only for the second camera with the second field of view similar to the first field of view, wherein the proposed one or more second workflows has a trigger for the second camera that is similar to the first trigger and an action similar to the first action, and wherein the action comprises a response triggered by the trigger.

9. The method of claim 8 wherein each second proposed workflow has the trigger similar to the first trigger and the first action for execution of the action based on detection of the trigger.

10. The method of claim 8 further comprising the step of:

accessing a table comprising assignments for each camera for a particular action; and wherein the action similar to the first action comprises a response that is assigned based on the table.

* * * * *